(12) United States Patent
Candelore

(10) Patent No.: US 9,647,981 B2
(45) Date of Patent: May 9, 2017

(54) NETWORK DISCOVERY AND CONNECTION USING DEVICE ADDRESSES NOT CORRELATED TO A DEVICE

(71) Applicant: SONY CORPORATION, Tokyo (JP)

(72) Inventor: Brant Candelore, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 729 days.

(21) Appl. No.: 14/044,353

(22) Filed: Oct. 2, 2013

(65) Prior Publication Data

US 2015/0095501 A1    Apr. 2, 2015

(51) Int. Cl.
*G06F 15/16* (2006.01)
*H04L 29/12* (2006.01)

(52) U.S. Cl.
CPC ...... *H04L 61/2038* (2013.01); *H04L 61/2092* (2013.01); *H04L 61/6004* (2013.01); *H04L 61/6022* (2013.01)

(58) Field of Classification Search
CPC . H04L 61/2092; H04L 63/0407; H04W 12/02
USPC ........................................ 709/245, 225, 227
See application file for complete search history.

(56) References Cited

U.S. PATENT DOCUMENTS

| | | |
|---|---|---|
| 2004/0117657 A1 | 6/2004 | Gabor et al. |
| 2005/0021786 A1 | 1/2005 | Kikkawa et al. |
| 2005/0050352 A1* | 3/2005 | Narayanaswami ..... H04L 63/08 726/4 |
| 2007/0019609 A1 | 1/2007 | Anjum |
| 2010/0118833 A1 | 5/2010 | Hahn et al. |
| 2012/0213211 A1 | 8/2012 | Remaker |
| 2012/0257753 A1 | 10/2012 | Ochikubo et al. |
| 2014/0256262 A1* | 9/2014 | Park .................... H04L 63/0407 455/41.2 |

OTHER PUBLICATIONS

"The Leading Provider of In-Store Analytics" RetailNext: Comprehensive In-Store Analytics, printed Aug. 22, 2013.
Lee Hutchinson, "iSO 8 to stymie trackers and marketers with MAC address randomization" Infinite Loop/ The Apple Ecosystem, Jun. 9, 2014. http://arstechnica.com/apple/2014/ios8-to-stymie-trackers-and-marketers-with-mac-add . . . .

* cited by examiner

*Primary Examiner* — David Lazaro
(74) *Attorney, Agent, or Firm* — John L. Rogitz; John M. Rogitz

(57) ABSTRACT

To prevent tracking as it roams through a network of wireless access points (WAPs), a wireless device changes the MAC address. The device does this by randomizing some or all of the bits in the MAC address or selecting the MAC address from a group of MAC addresses assigned to the device by the device manufacturer. Furthermore, in order to further confuse tracking and make analytics not useful, a device can share MAC addresses with other devices, and check to make sure that a shared MAC address is not actively being used before selecting and using it.

11 Claims, 2 Drawing Sheets

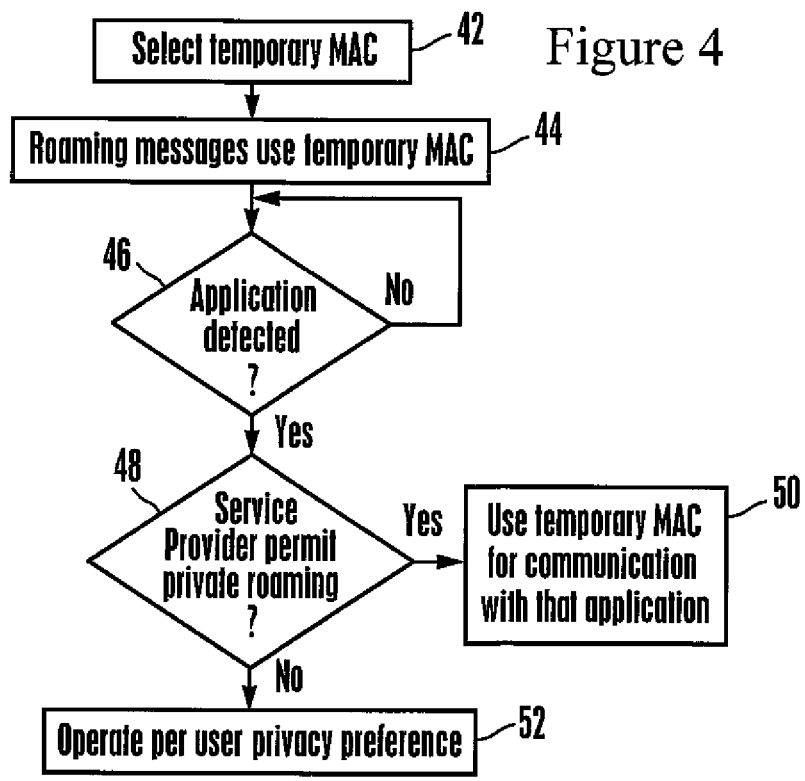
Figure 4
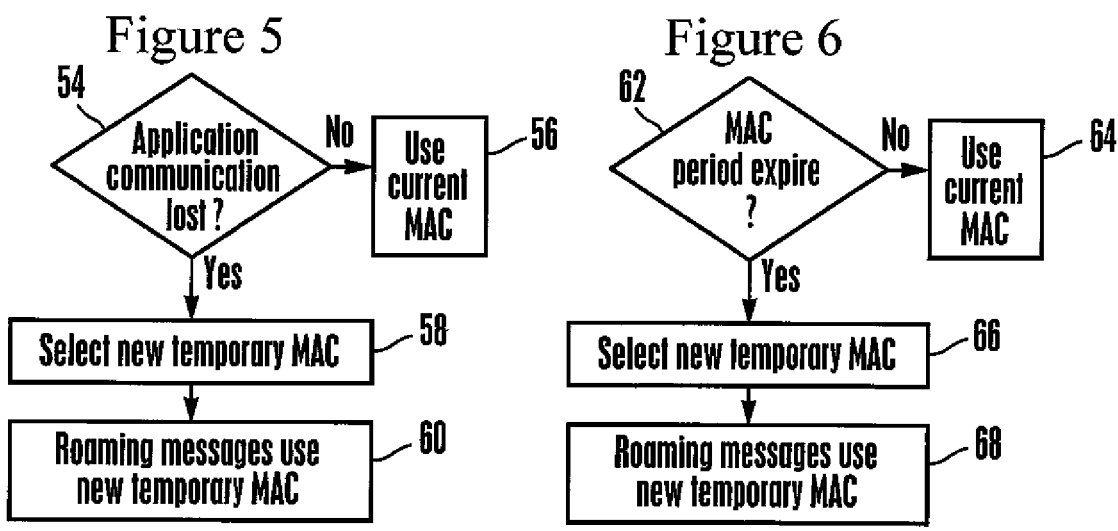
Figure 5
Figure 6
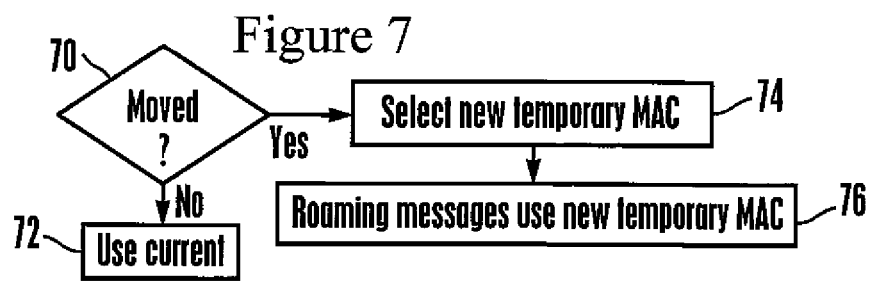
Figure 7

NETWORK DISCOVERY AND CONNECTION USING DEVICE ADDRESSES NOT CORRELATED TO A DEVICE

FIELD OF THE INVENTION

The present application relates generally to enabling users to avoid having their wireless devices being tracked, recorded, and correlated by providing the devices with anonymous addresses for use in network transmissions.

BACKGROUND OF THE INVENTION

Note that the discussion below is background information only and is not intended as an admission that anything discussed necessarily is prior art.

Tracking people by means of tracking their portable computing devices (such as wireless telephones) has become endemic. So called "smart phones" often support the wireless personnel area network (WPAN) technology, Bluetooth, and the wireless local area network (WLAN), technology IEEE 802.11, marketed under the Wi-Fi brand. And furthermore, as phones, they support cellular network technology. Because of their shorter range, the WPAN and WLAN technologies provide a convenient way to physically pinpoint and track shoppers in a mall so that retailers can know how much time shoppers spend in various parts of a store and in front of store fronts and displays. In this way, the overall time in a store can be measured and effectiveness of store fronts and displays in arresting a shopper's attention can be inferred. Also, the number of repeat visits over periods of time can be tracked to learn whether customers are new or repeat. Such tracking information ostensibly is useful in rendering shopping more efficient and convenient to the shopper, as tracking information can be used to design more efficient store layouts, more informative signs, and so on such that shoppers can find products more easily.

To enable tracking, monitoring stations are set up e.g. in the stores that act as wireless access points (WAPs) to initiate communication with mobile devices, but where network connectivity cannot be achieved. Alternatively, depending on the density of WAPs surrounding a store, monitoring stations are set-up that listen in on the communications between the mobile devices and these nearby WAPs. From the retailers' point of view, tracking people by means of their devices can even link a shopper's online shopping with his offline shopping, for example, by capturing a customer's name. This can be accomplished by first tracking and then capturing the customer's name right at the cash register when paying with a credit card which usually includes the customer's name, and then later correlating the customer's name to online databases. The retailer can then leverage both online and offline behavior against each other to increase sales. For example, the retailer may try to provide a coupon to that customer through email or webpage in order to bring that customer back into the store to shop.

It should be noted, that with the device MAC address monitoring, it may be possible to track a person to an automobile, a physical residence and place of business. It does not matter that the content delivered over the network to/from that device may have been encrypted as device identifying information, e.g. the MAC address, is typically outside the data payload being protected by encryption.

While tracking the wireless device of shoppers is attractive to retailers, as understood herein, not all shoppers are enthusiastic about being surreptitiously tracked every step of the way. Moreover, not entirely unfounded concerns have arisen over the potential for misusing pervasive, perpetual tracking information that ensnares most of the public. In short, present principles understand that more than a few shoppers might wish to remain anonymous as they gallivant through a shopping mall or in general cavort through life.

SUMMARY OF THE INVENTION

Present principles understand that in some cases, interaction with the mobile device can be facilitated by faking the service set identifier (SSID) to popular distributed access points such as "attwifi" or "verizonwifi". A mobile device configured to search for one these popular SSIDs will communicate in vain with the fake WAP in order to access the ATT or Verizon network. Furthermore, if combined with video from a webcam, it is possible to determine the age group and sex of the customer. Later, when that customer is detected as coming into the store, targeted advertising could be delivered using properly placed video monitors.

And simply monitoring certain web data interactions, along with the MAC addresses, on the mobile devices might reveal the applications that are running on the devices. The applications, e.g. Facebook, might reveal if the customer is a child, teenager or young adult. And the MAC addresses often can reveal the type of mobile device that it is. For example, Sony's cell phone has an organizationally unique identifier (OUI) registered as "Sony_Mob" which can be assumed to be "Sony Mobile"—a MAC address assigned to Sony cellphones. By knowing what type of mobile device is, the types of loaded applications can often be inferred. For example, Apple iPhones in the ATT network might be expected to always have certain applications loaded. And Sony Experia smartphone in the Verizon network can be expected to have different applications loaded and running. In store targeted advertising can be directed to those mobile devices and applications.

Thus, as understood herein, wireless device (and, hence, people) tracking is facilitated, however unwittingly, by network communication protocols, in which wireless devices are programmed to automatically seek out wireless access points (WAPs) using exploratory messages, colloquially referred to as "pings". The wireless devices may continue to periodically ping the WAPs regardless of whether the WAP can be successfully accessed, e.g. the security keys are known or can be negotiated. Pinging enables the wireless device to ascertain the best WAP with which to communicate by determining e.g. signal strength, the name of the WAP, and whether or not a security key or credentials are required and available, so that a list of WAPs may be presented to the user for selection. After selecting one and entering any keys, if need be, the user of the device can browse Internet web pages, use email, send text messages and tweets, communicate by video conferencing, and so on using the WAP. The mobile device can usually be programmed to reconnect with the WAP in the future when the device comes into range of the WAP. As mentioned above, the retailer can take advantage of this fact by faking popular WAPs with SSIDs labeled with, for example, "attwifi" or "verizonwifi". The device will see the SSID and maintain prolonged contact with the imposter WAP.

In constantly, automatically, and unobtrusively (to the user) reaching out to the network, wireless devices send exploratory messages that include identifiers such as media access control (MAC) addresses. These are unique addresses, often one for each technology the device uses, e.g., one MAC address for Bluetooth, one for Ethernet, and one for Wi-Fi, that are unique to the device and that typically are assigned by the manufacturer of the device from a range allocated to that manufacturer and, hence, correlated to the device.

MAC addresses can be used for access control to wired local area networks (LAN) and wireless local area network (WLAN). In some corporate environments with strict security policies, every device accessing a wired or wireless network must be known. And this can be done by manually including the MAC in an access control list that the WAP checks in order to create a connection with that device. Presumably, the WAP may be able to determine if the MAC is already in use elsewhere in the corporate environment. However, often times, access control may be done at a higher software layer of functionality that can use public/private key credentials using X.509 certificates and a protocol such as Transport Layer Security (TLS). TLS allows a client device to not only authenticate a server, but for the server to authenticate a client device in a process known as "mutual authentication". By verifying the credentials of the client, e.g. the mobile device, the WAP, acting as a server, is able to grant access to the network. This can be in addition to or instead of using the MAC for access control. In large corporate environments, there may less risk of surreptitious tracking because the physical space may be controlled and there would be no WAPs other than those installed by the corporate entity. However, many corporate environments are shared with various businesses operating side-by-side. For example, someone could be parked in a car outside a place of business and wirelessly collect information from all the smart devices from the employees of that business. People can also be tracked while travelling in cars. Surreptitious tracking can therefore extend from retail, to vehicles, to residences and even places of business. It is possible to discover where people shop, drive, live and work.

To allow devices to access wireless network environments where MAC access control is desired, it would be desirable to have a means to allow the WAP to recognize a device's MAC that is in use while still preventing correlation of addresses to specific devices by eavesdroppers.

In public places such as coffee shops and airports, MAC addresses are usually not used for access control. In many cases, there may be no security at all. The content is sent in-the-clear. In hotels, there is often the need to input a WEP or WAP key to access a WAP. There may be the need to navigate a webpage for authorization, where a room number, name and payment information may be entered. But typically, a hotel does not require identification of the user's MAC address when accessing the wireless network. It is the same situation for most people's wireless home network. The WAP does not need to know the MAC address a priori. And so consequently, in most public places, the MAC address for a WLAN device is simply not checked against an access list. The only criteria being that the MAC must be unique among the devices accessing the WAP at a particular time and on a particular sub-net, which is important for low level routing of data packets—the so called "link layer". Typically only the WAP cares about the MAC as the information that is sent on to remote servers are typically IP datagrams which doesn't include the MAC information on the so called "network layer". And so for a non-MAC access controlled environment, while it may be important that the MAC be unique for a particular WAP, present principles recognize that the MAC could in fact be re-used with different mobile devices at different times. And different WAPs could have wireless devices accessing them independently with the same MAC at the same time.

Thus, present principles recognize the desirability of having a means to prevent MAC tracking for situations when the WAP does not use the MAC for access control.

The MAC address used in Ethernet style addressing consists of 48 bits of data. This is potentially a space of $2^{48}$ or 281,474,976,710,656 possible MAC addresses. This is over 281 trillion addresses. The first 24 bits of the address may be an organizationally unique identifier (GUI). The remaining 24 bits are assigned by the owner or assignee of the OUI. The address space of the 24 bits is $2^{24}$ or 16,777,216 MAC addresses. In one embodiment, a device according to present principles "pings" WAPs while roaming e.g. in public spaces uses completely random MACs using the entire 48 bit address space. The chances of a collision with another device with the same randomly chosen address are thus relatively small. Also, the device may select a random address using a reduced bit space, e.g. where the OUI bits may be set and the remaining bits are random. When selected, the MAC may be kept static for the period of the session. The addresses in this reduced bit space may still be so large that it would be unlikely for there to be a collision with another device talking to the same WAP. As a precaution, present principles recognize that it is possible for the device to monitor other devices communicating with the WAP to make sure that the random MAC chosen is not one that is in use. And if a conflict is detected with one in use, the device may simply change the MAC to a different one. It should be noted that depending on how many devices have the same OUI bits set, it may be possible to use the OUI bits to track a device.

Furthermore, present principles recognize that in some embodiments, to address WAPs which may check the MAC of devices against an access control list, a device according to present teachings may "ping" WAPs using a MAC chosen from a group of possible MACs associated with a single device. Instead of an access list containing a single MAC for a device, it could contain, for example, 16 or 32 MAC addresses for a device. Ideally, there would be no correlation between MAC addresses so that by capturing one MAC address the mobile device could not be tracked through the other MAC addresses.

Present principles also recognize that in some embodiments, a number of devices from a manufacturer may share a certain number of MAC addresses. When devices from the manufacturer come into the store and ping the WAP at different times, they may pick the same MAC. The device can monitor traffic to make sure that a shared MAC that is chosen is unique for the instance in time. This would confuse the store's MAC tracking system. The data collected along with the analytics would be "corrupted" with MAC addresses that represented communication from multiple devices and not just a single one.

Present principles recognize a number of possible device behaviors when managing a fixed number of multiple MAC addresses. For example, whenever a public WAP is pinged while roaming around, when changing from one WAP to a different WAP, a different MAC from the group of MACs may be used. Further, the device may maintain the MAC for a period of time, e.g. 4 hours or 8 hours, before changing to another one. However, keeping the period of time short, e.g. 10 minutes, would keep a retailer from using tracking during a store visit which would typically be much long. Keeping the MAC stable may facilitate the hand-off from one WAP to another in case the device is in an active session and moving around (e.g., which may preserve the IP address). Also, if a device is in an active session, then the MAC could be made to not change during a hand-off from one WAP to another. Further still, present principles may recognize that devices may periodically log-out and back in to a WAP with a different MAC address. A device can therefore do this every 10 or 15 minutes and be hardly noticed by the user since a device can do this fairly rapidly taking a couple of seconds.

In any case, the MACs are not "static" in the sense that their use is limited, meaning that a service provider (SP) of WAPs, e.g. owner of a department store, depending on the device settings cannot track the same MAC around as a person possessing the wireless device roams a store or subsequently visits the same store.

If desired, once a WAP initially has been located using a MAC, and it is known to use MAC access control, user-driven data through that WAP may be conducted using the non-anonymous MAC of the device, e.g. unique or chosen from a group of MACs associated with that device, and then when communication with that WAP ceases, the device reverts to using changing anonymous, e.g. random, MACs to ping WAPs during subsequent roaming.

The group of MACs through which the device cycles when roaming may be issued to the device by the manufacturer of the device, or by the SP of a network of WAPs. In any case, a device's MAC for a particular network may be non-static in that the group of MACs is cycled through during roaming, so that a monitor of WAPs cannot pin down the shopper using a particular MAC. In the case of a network with MAC access control, the MAC may be recognized as one of a number of MACs assigned to a particular device. If the WAP cannot handle multiple MACs assigned to a device, then the device may choose one of the MACs as its persistent or permanent MAC. This MAC may be assigned by the manufacturer or the service provider.

In another aspect, a wireless communication device includes a wireless transceiver and a computer readable storage medium bearing a permanent address associated with the wireless transceiver and uniquely identifying the device and plural temporary addresses. The plural temporary addresses are provided by a manufacturer of the device or by a service provider (SP) of a wireless network. A processor is configured for accessing the computer readable storage medium to execute instructions which configure the processor for selecting a first temporary address from the plural temporary addresses, and sending a first wireless network message including the first temporary address through the wireless transceiver pursuant to discovering a wireless access point (WAP). The processor selects a second temporary address from the plural temporary addresses and sends a second wireless network message including the second temporary address through the wireless transceiver pursuant to discovering a WAP. If desired, the addresses can be media access control (MAC) addresses.

In some implementations, the instructions when executed by the processor further configure the processor for using the permanent address for communication of user voice and/or user data messages through the wireless transceiver. This may be desired e.g. for WAPs which perform access control on the MAC and that do not have knowledge of the temporary MAC addresses. If desired, the instructions when executed by the processor further configure the processor for not using the permanent address for communication of user voice and/or user data messages through the wireless transceiver responsive to a signal from a WAP to use the permanent address, and instead using one of the temporary addresses for communication of user voice and/or user data messages through the wireless transceiver in the absence of a signal from a WAP to use the permanent address. Responsive to a signal from a WAP to use the permanent address, the device may cease communication with the WAP, and/or present an alert on the device perceptible by a person that a network does not permit anonymous communication.

On the other hand, the instructions when executed by the processor may further configure the processor for using the permanent address for communication of user voice and/or user data messages through the wireless transceiver responsive to a signal from a WAP to use the permanent address. In this case one of the temporary addresses can be used for communication of user voice and/or user data messages through the wireless transceiver in the absence of a signal from a WAP to use the permanent address.

In some embodiments a portion of each temporary address otherwise indicating a manufacturing entity according to a standard address format is formatted to indicate an entity that does not exist. In this way use of a temporary address does not identify the device with a manufacturing entity. The manufacturing entity is often a way to reveal the type of device.

In another aspect, a method to prevent tracking a wireless device as it roams through a network of wireless access points (WAPs) includes selecting a first temporary MAC address from a group of temporary MAC addresses provided by a device manufacturer or by a service provider (SP) of the WAPs. The method also includes "pinging" for WAPs using the first temporary MAC address, and pinging for subsequent WAPs using a second temporary MAC address.

The details of the present invention, both as to its structure and operation, can best be understood in reference to the accompanying drawings, in which like reference numerals refer to like parts, and in which:

BRIEF DESCRIPTION OF THE DRAWINGS

FIGS. 4-7 are flow charts of example roaming logic.

DETAILED DESCRIPTION OF THE PREFERRED EMBODIMENT

Figure 1:
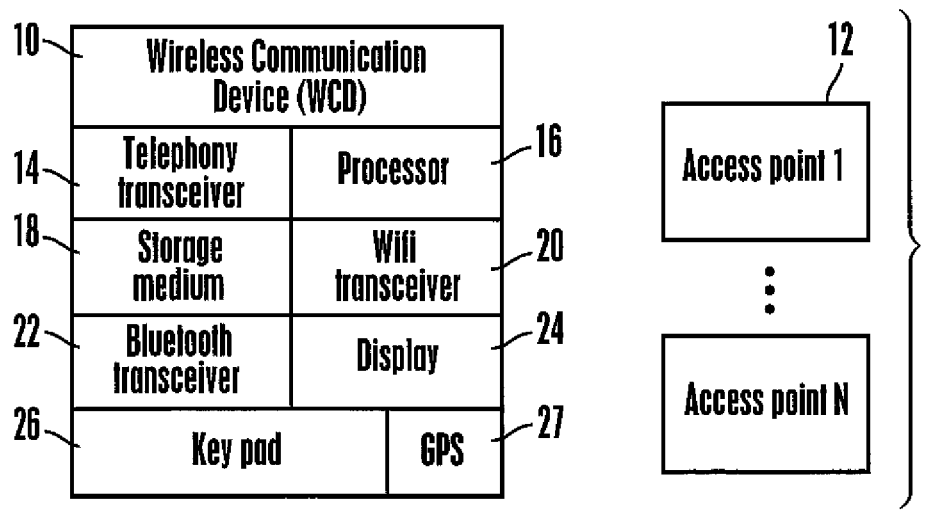
FIG. 1 is a block diagram of an example wireless communication device (WCD) in one intended environment.

Referring initially to FIG. 1, a wireless communication device (WCD) 10 is shown configured for wireless communication with one or more wireless access points (WAP) 12 typically provided by a service provider (SP). Non-limiting examples of WCDs include wireless telephones, digital readers, cameras, laptop computers, notebook computers, smart watches and tablet computers.

In the example shown, the WCD 10 is a wireless telephone and so includes a wireless telephony transceiver 14 controlled by one or more WCD processors 16 accessing one or more computer readable storage media 18 such as read-only memory (ROM) and variants thereof, random access memory and variants thereof, and physically embodies as, for example, disk-based or solid-state storage. The telephony transceiver 14 may be, without limitation, a Global Systems for Mobile communication (GSM) transceiver and variants thereof, code division multiple access (CDMA) transceiver and variants thereof, frequency division multiple access (FDMA) transceiver and variants thereof, time division multiple access (TDMA) transceiver and variants thereof, space division multiple access (SDMA) transceiver and variants thereof, orthogonal frequency division multiplexing (OFDM) transceiver and variants thereof, etc.

The WCD 10 may include other wireless transceivers as well. For example, the WCD 10 may include a Wi-Fi transceiver 20 controlled by the processor 16 as well as a Bluetooth transceiver 22 controlled by the processor 16. The processor 16 may output visible information in a display 24, which may be a touchscreen display, and receive user input from a keypad 26, which may be a physical keypad separate from the display 24 or which may be a virtual keypad presented on a touch sensitive display 24. The processor 16 may receive position information from a position sensor, such as a global positioning satellite (GPS) receiver 27.

Typically, each network interface, in the example shown, each transceiver 14, 20, 22, is assigned a respective permanent media access control (MAC) address by the manufacturer of the device at the time of manufacture. This MAC address (or addresses when multiple network interfaces are provided) are unique to the WCD 10, i.e., a MAC address uniquely identifies the WCD with which it is associated. Messages sent through a wireless interface typically include the MAC address so that the device essentially is revealing its unique identity every time it sends a message, although some telephony transceivers may use identifiers of the WCD other than the MAC. Regardless, it is to be understood that while for disclosure purposes unique MAC addresses are used as an example of present principles, other device addresses that otherwise would uniquely identify the device may also be used.

Figure 2:
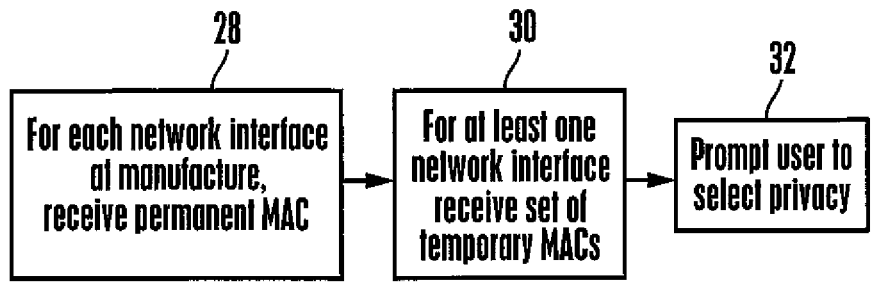
FIG. 2 is a flow chart of example setup logic.

A MAC address may be e.g. 48-bits in length. For example, a MAC address may consist of six groups of two hexadecimals separated by hyphens or colons, as in 12.34.56.78.90.ab. Some of the bits identify the organization that issued the address, while the remaining bits can be assigned as the organization desires subject to the constraint of uniqueness. With this general understanding in mind, attention is now drawn to FIG. 2. Like the other flow charts discussed herein, FIG. 2 illustrates logic that the processor 16 or other processor can be configured to execute when accessing instructions on a computer readable storage medium. The use of flow chart format is for illustration only and is not a limitation, in that other logical forms such as state logic can be used.

Commencing at block 28, a respective unique address such as a permanent MAC address is associated with each respective wireless interface of the device 10 by the manufacturer of the device 10 at time of manufacture. At block 30 one or more wireless interfaces that have been assigned a permanent MAC may also be assigned a set of plural temporary addresses. This set of temporary addresses may be assigned by the manufacturer of the device at time of manufacture, for example, or in another example may be assigned by the SP associated with the WAPs 12 at time of first contact of the device 10 with the WAPs 12. The assigning entity of temporary MACs may or may not maintain a record of the device to which the temporary MACs were assigned. If the assigning entity records which device received which temporary MACs, that correlation information may be maintained in encrypted form and be unavailable to the network at large.

In any case, the temporary MACs preferably are formatted in the same way as the permanent MAC so that they will be recognized as a valid MAC. That is, the temporary MACs preferably will have the same number of bits and same hexadecimal arrangement as the permanent MAC. However, whereas a portion of the permanent MAC indicates the manufacturer of the device 10, the portion of each temporary MAC that otherwise would indicate a manufacturing entity according to a standard address format can be formatted to indicate an entity that does not exist, such that use of a temporary address does not identify the device with a manufacturing entity and, hence, in effect does not identify the device. Ideally, the temporary addresses may not be in a contiguous range which would indicate a single device. For example, there should not be any obvious relationship between the temporary addresses in some embodiments. In other embodiments, the temporary MACs may indicate the entity that assigned the temporary MACs to the device 10.

Similarly, temporary MACs may use the same bit as the permanent MAC in indicating whether the temporary MAC is locally or universally administered. As understood herein, by assigning temporary MACs on this basis instead of randomly generating entire bit strings can alleviate the problem of a recipient receiving data that does not fit an expected format.

Figure 3:
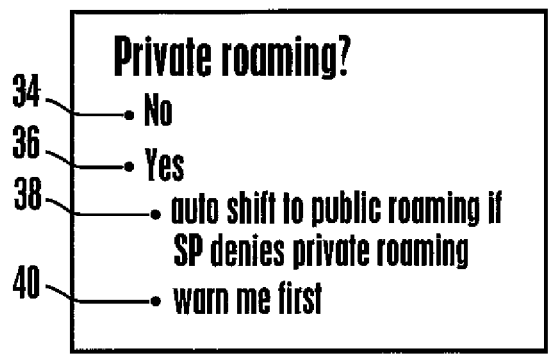
FIG. 3 is a screen shot of an example display permitting a user of the WCD to establish a privacy preference.

Proceeding to block 32, the device 10 can prompt the user to select a privacy policy with respect to use of the temporary MACs. FIG. 3 is an example that informs. A user interface (UI) is shown that can be presented on the display 24 of the device 10 to enable the user to select (34) not to engage in private roaming according to description below, in which case the temporary MACs are not used and only the permanent MAC is conventionally used.

However, the user can select (36) private roaming in which case the user may be given additional options if desired. At 38 the user can select to use the temporary MACs at least for roaming purposes according to principles below, and to automatically shift to using the permanent MAC in the event that an SP providing WAPs attempting to be contacted by the device 10 deny acceptance of temporary MACs. Or, the user can select at 40 to be first warned that an SP providing WAPs attempting to be contacted by the device 10 denies acceptance of temporary MACs prior to shifting to use of the permanent MAC. Until the user subsequently inputs a signal desiring to shift to the permanent MAC, the device 10 may cease communication with the WAP.

Assuming that use of temporary MACs at least for roaming purposes is instantiated, FIG. 4 shows that at block 42 the processor 16 selects a first temporary MAC from the plural temporary MACs. Moving to block 44, a wireless network message such as a roaming message attempting to establish contact with a WAP is transmitted containing the temporary MAC selected at block 42. Such a message may be referred to as a "ping". If a WAP is detected at decision diamond 46 (as indicated by, e.g., a response to a "ping" from a WAP), it is determined at decision diamond 48 in response whether the SP associated with the responding WAP permits private roaming using temporary MACs. If so, the temporary MAC selected at block 42 is used at block 50 for communications with the responding WAP. Alternatively, another temporary MAC different from the MAC that was used for the "ping" message can be used. Yet again, the permanent MAC can be used at block 50 for ensuing messages to the responding WAP, e.g., for messages attendant to user-driven voice and/or data communications. On the other hand, if it determined at decision diamond 48 that the SP associated with the responding WAP does not permit private roaming using temporary MACs, the logic moves to block 52 to operate per the user-defined privacy preferences exemplified in FIG. 3.

FIGS. 5-7 illustrate example logic for selecting new temporary MACs, it being understood that one or more selection criteria shown in FIGS. 5-7 may be employed.

Commencing at decision diamond 54, following selection of an initial temporary MAC and establishing communication with a WAP, it is determined whether communication with a WAP has been lost. If not, the currently selected temporary MAC may continue to be used in communication with that WAP at block 56. However, upon loss of communication with a WAP the logic may select a new temporary MAC at block 58 for use in subsequently transmitted roaming messages using the newly selected temporary MAC at block 60. In this way, if communication is again established either with the prior WAP or with a new WAP, the device 10 cannot be tracked as the user moves.

In FIG. 6, commencing at decision diamond 62 it is determined whether a currently selected temporary MAC has been used for longer than a use period, e.g., five minutes. If not, the currently selected temporary MAC is continued to be used at block 64. However, upon elapse of the use period the logic may select a new temporary MAC at block 66 for use in subsequently transmitted roaming messages using the newly selected temporary MAC at block 68. In this way, tracking of the device 10 cannot occur for longer than the use period.

In FIG. 7, commencing at decision diamond 70 it is determined whether, since beginning use of a temporary MAC, the WCD has moved, e.g., beyond a threshold distance since start of use of the MAC, as indicated by, for example, signals from the GPS receiver 27 in FIG. 1. Another indication that may be used to determine whether the WCD has moved is the acquisition by the WCD of a new WAP. If the WCD has not moved according to the test at decision diamond 70, the currently selected temporary MAC is continued to be used at block 72. However, if the WCD has moved away from the initial MAC position by the threshold distance, the logic may select a new temporary MAC at block 74 for use in subsequently transmitted roaming messages using the newly selected temporary MAC at block 76.

Without reference to any particular figure it is to be understood that in some embodiments, a wireless communication device may include at least one wireless transceiver and at least one processor configured for accessing a computer readable storage medium to execute instructions which configure the processor for monitoring the communication traffic to one or more wireless access points (WAPs) to learn which device addresses are already in use by other wireless communication devices, creating or selecting a first temporary device address that is different than devices already in use, sending a first wireless network message including the device address through the wireless transceiver pursuant to discovering a WAP that the user wishes to communicate with, continuing to monitor the communication traffic to one or more WAPs to learn if there are any new devices with device address in use by other wireless communication devices, creating or selecting a second address that is different than the devices in use, and sending a second wireless network message including the second address through the wireless transceiver pursuant to discovering a wireless access point (WAP).

Also in some embodiments, a wireless access point may include at least one wireless transceiver and at least one processor configured for accessing a computer readable storage medium to execute instructions which configure the processor for maintaining an access control list of wireless device addresses that can access the wireless access point where the access control list contains two or more entries for device addresses for a single wireless device, and granting access to the wireless network if a device address appears in the access control list.

While the particular NETWORK DISCOVERY AND CONNECTION USING DEVICE ADDRESSES NOT CORRELATED TO A DEVICE is herein shown and described in detail, it is to be understood that the subject matter which is encompassed by the present invention is limited only by the claims.

What is claimed is:
1. A wireless communication device comprising:
at least one wireless transceiver;
at least one processor configured for accessing a computer readable storage medium to execute instructions which configure the processor for:
selecting a first device address from a group of device addresses assigned to the device;
sending a first wireless network message including the first device address through the wireless transceiver responsive to discovering a wireless access point (WAP);
selecting a second device address from a group of device addresses assigned to the device different from the first device address; and
sending a second wireless network message including the second address through the wireless transceiver responsive to discovering a WAP, wherein one or more of the device addresses assigned to a device are shared by other devices at different times and configured such that an address tracker is unable to distinguish between the devices using the shared device addresses.

2. The device of claim 1, wherein the wireless communication device determines that a device address selected from a group of shared addresses is not being used by another device prior to being used by the wireless communication device.

3. The device of claim 1, wherein one of the addresses is a permanent address configured for use when a WAP prevents use of non-permanent random addresses and/or multiple addresses.

4. The device of claim 1, wherein the addresses are media access control (MAC) addresses.

5. The device of claim 1, wherein a portion of each address otherwise indicating a manufacturing entity according to a standard address format is formatted to indicate an entity that does not exist or an incorrect entity, such that use of a temporary address does not identify the device with a manufacturing entity or correct manufacturing entity.

6. A wireless communication device comprising:
at least one wireless transceiver;
at least one computer readable storage medium bearing a permanent address associated with the wireless transceiver and uniquely identifying the device and plural temporary addresses, the plural temporary addresses being provided by a manufacturer of the device or by a service provider (SP) of a wireless network; and
at least one processor configured for accessing the computer readable storage medium to execute instructions which configure the process for;
selecting a first temporary address from the plural temporary addresses;
sending a first wireless network message including the first temporary address through the wireless transceiver pursuant to discovering a wireless access point (WAP);
selecting a second temporary address from the plural temporary addresses;

sending a second wireless network message including the second temporary address through the wireless transceiver pursuant to discovering a WAP;

not using the permanent address for communication of user voice and/or user data messages through the wireless transceiver when a WAP requires use of the permanent address; and using at least one of the temporary addresses for communication of user voice and/or user data messages through the wireless transceiver when a WAP does not require use of the permanent address.

7. The device of claim 6, wherein the addresses are media access control (MAC) addresses.

8. The device of claim 6, wherein the instructions when executed by the processor further configure the processor for:

using the permanent address for communication of the voice and/or user data messages through the wireless transceiver.

9. The device of claim 6, wherein a portion of each temporary address otherwise indicating a manufacturing entity according to a standard address format is formatted to indicate an entity that does not exist or an incorrect entity, such that use of a temporary address does not identify the device with a manufacturing entity or correct entity.

10. A wireless communication device comprising:
at least one wireless transceiver;
at least one computer readable storage medium bearing a permanent address associated with the wireless transceiver and uniquely identifying the device and plural temporary addresses, the plural temporary addresses being provided by a manufacturer of the device or by a service provider (SP) of a wireless network; and
at least one processor configured for accessing the computer readable storage medium to execute instructions which configure the processor for:
selecting a first temporary address from the plural temporary addresses;
sending a first wireless network message including the first temporary address through the wireless transceiver pursuant to discovering a wireless access point (WAP);
selecting a second temporary address from the plural temporary addresses;
sending a second wireless network message including the second temporary address through the wireless transceiver pursuant to discovering a WAP;
responsive to a WAP that requires the use of the permanent address:
ceasing communication with the WAP; and/or
presenting an alert on the device perceptible by a person that a network does not permit anonymous communication.

11. A wireless communication device (WCD) comprising:
at least one wireless transceiver;
at least one computer readable storage medium bearing a permanent address associated with the wireless transceiver and uniquely identifying the device and plural temporary addresses, the plural temporary address being provided by a manufacturer of the device or by a service provider (SP) of a wireless network; and
at least one processor configured for accessing the computer readable storage medium to execute instructions which configure the processor for;
selecting a first temporary address from the plural addresses;
selecting a first wireless network message including the first temporary address through the wireless transceiver pursuant to discovering a wireless access point (WAP);
selecting a second temporary address from the plural temporary addresses;
sending a second wireless network message including the second temporary address through the wireless transceiver pursuant to discovering a WAP;
using the permanent address for communication of user voice and/or user data messages through the wireless transceiver when a WAP is only able to handle the permanent address; and
using at least one of the temporary addresses for communication of user voice and/or user data messages through the wireless transceiver for WAPs that do not need to use the permanent address.

* * * * *